UNITED STATES PATENT OFFICE.

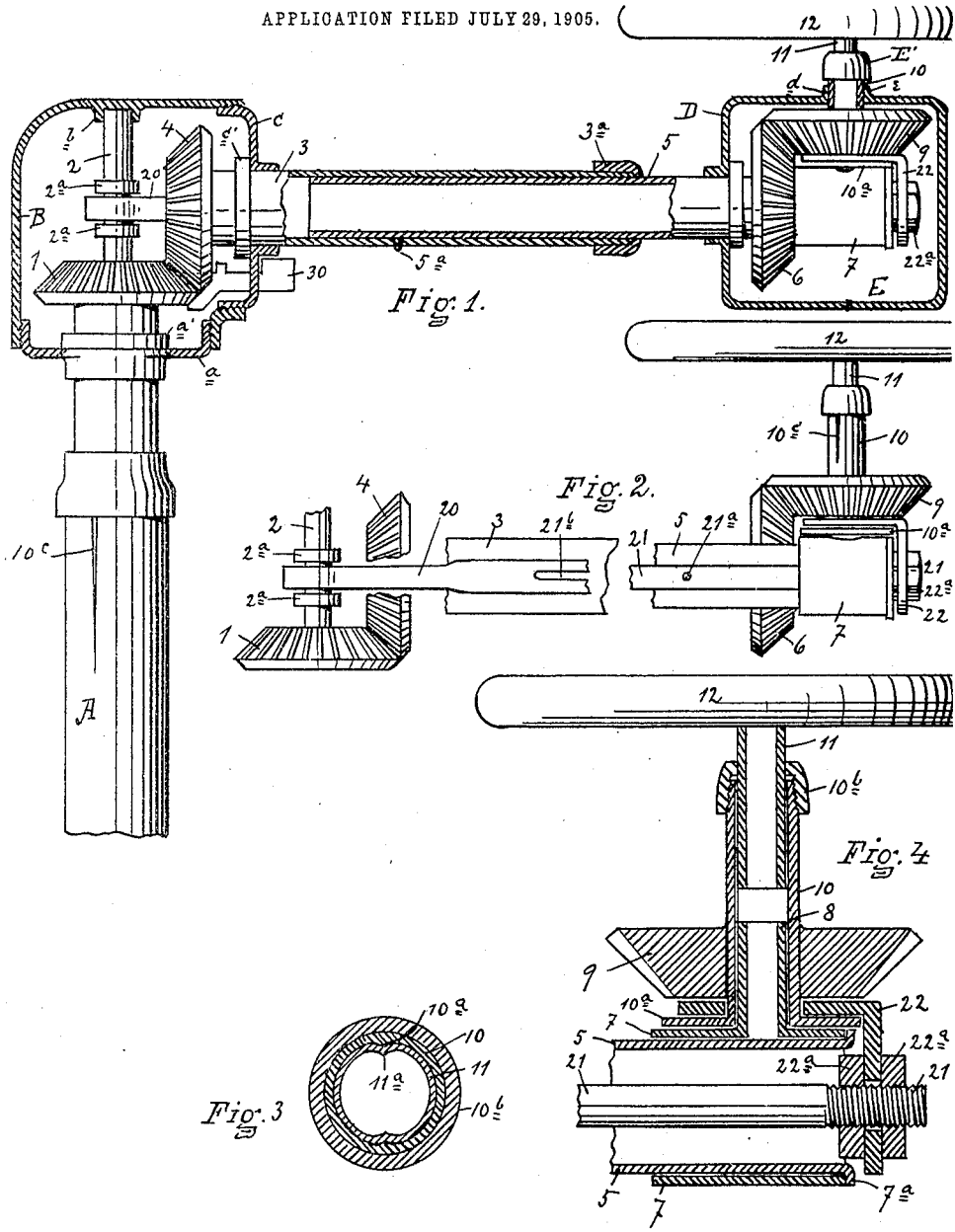

HENRY M. LOVE, OF UTICA, NEW YORK.

STEERING-GEAR.

No. 851,680.  Specification of Letters Patent.  Patented April 30, 1907.

Application filed July 29, 1905. Serial No. 271,743.

*To all whom it may concern:*

Be it known that I, HENRY M. LOVE, a citizen of the United States, residing at Utica, in the county of Oneida and State of New York, have invented certain new and useful Improvements in Steering-Gear, of which the following is a specification, reference being had therein to the accompanying drawings.

My invention relates to an improved steering gear for automobiles and the like, and I declare that the following is a full, clear, concise and exact description thereof, sufficient to enable one skilled in the art to make and use the same, reference being had to the accompanying drawings in which like letters and numerals refer to like parts throughout.

In some automobiles, especially those of the heavier types, the steering is done by turning an upright shaft on which is mounted a steering wheel. This shaft is located between the knees of the driver, the wheel being immediately in front of him.

The purpose of my invention is to provide a steering mechanism by which the shaft can be placed at one side of the driver so as to be out of his way in case of accident and at the same time to provide a steering wheel in front of him, but which can be instantly pushed out of the way, or even swung around in front of the next seat. I propose a construction by which the steering wheel can be swung without affecting the direction of the vehicle wheels, and without turning the steering wheel on its bearing so far as the relation of its grips to the hands of the driver is concerned. I also show how the plane of the wheel may be given any desired pitch and elevation. In addition I provide means whereby the wheel can be adjusted at a greater or less distance from the shaft. In other words, I remove the shaft from in front of the driver, but provide a steering wheel which can be adjusted to any position or plane, the moving of which relative to the shaft does not turn the shaft, so that it is not necessary to hold the wheel rigidly in position relative to the shaft, but only on its own axis or bearing, and, furthermore, by which in case of accident the wheel will be instantly thrown from before the driver.

The device is applicable to different mechanisms usually located beneath the vehicle body, not here shown, but by which the conditions of a positive steering mechanism are met. These conditions, it should be noted, are not disturbed by the present device.

In the drawings attached hereto, I illustrate the invention in a single form, but to the particulars of which I do not limit myself, merely disclosing one form which the invention may be given.

Figure 1 is a partly sectional side view of the device, showing the main shaft with an arm thereon and the steering wheel, and also showing the lines of the casing or cover which is provided to inclose the parts. Fig. 2 is a detail view of parts not fully shown in Fig. 1. Fig. 3 is a view in detail of the connections between extensible parts. Fig. 4 is a detail view of the mounting of the steering wheel.

Referring to the drawings in detail, A represents the steering shaft. I do not show the parts which are connected with the lower end of this shaft as they are immaterial here and well known. It may be noted that those parts can be readily adjusted to effect the proper movement of the vehicle wheels relative to the steering wheel without relying upon the gears in the apparatus which I show to regulate that matter and that they may include the features of a positive mechanism, so called.

On the head of the shaft I mount beveled gear 1. This gear has a head piece or stud 2 fixed thereon or integral therewith or with the shaft A.

3 is a tubular arm having mounted on one end beveled gear 4 to engage gear 1.

5 is a tubular arm adapted to telescope in arm 3 and having a lug $5^a$ to travel in a slot provided in arm 3 to keep the arm 5 from turning; otherwise the device shown in Fig. 3 may be used. On arm 5 I mount beveled gear 6. The arm is extended beyond the beveled gear and supports the collar 7 which is loosely mounted thereon, the end of arm 5 being slightly upset so as to hold collar 7 on. On collar 7 is an upright member 8 integral with or fixed thereto.

On the part 8 is mounted sleeve 10 flared at its lower end $10^a$ and to which is suitably fixed beveled gear 9, meshing with gear 6. Collar 10 is suitably mounted to be turned on the part 8, but held against lifting therefrom. 11 is a like sleeve which is slipped into sleeve 10 and carries the steering wheel or handle.

In Fig. 3 is shown how the sleeves may be constructed to permit raising and lowering the wheel a distance, the sleeve 11 being creased longitudinally as at $11^a$ and sleeve 10 being correspondingly ribbed at 10ᵃ to keep the two from axial turning, the nut 10ᵇ being threaded to turn on the beveled and threaded end of sleeve 10 to clamp it to the other sleeve, it being cut longitudinally as at 10ᶜ for that purpose. Similar joints with creases and ribs may be provided for the main shaft A to provide further raising or lowering, and also in the arms 3 and 5 and 20 and 21.

It is thus seen that I have provided the necessary gearing for turning shaft A by means of wheel 12. If the arm formed of parts 3 and 5 is swung around the shaft it is turned axially and thereby the steering wheel is turned just enough to keep its relative position in the hands of the driver since I provide the same number of teeth in each of the gears described. In case of a jar of the vehicle so as to cause a slight forward movement of the hands or body, the wheels of the vehicle are not turned since that can be done only by turning the wheel on its axis and not by swinging the arm around the steering shaft. So the steering wheel may be swung in case it is necessary to throw it from before the driver or to permit another to steer.

The parts 3 and 5 are designed to telescope so that the distance of the wheel from the shaft may be adjusted. To secure a given adjustment the outer end of arm 3 is slotted longitudinally and threaded on a bevel. A hand-nut 3ᵃ is provided to clamp the slotted arm 3 upon arm 5. The creases and ribs shown in Fig. 3 may be used if preferred and lug 5ᵃ be omitted.

I provide a casing for the parts which has a function also in holding the inclosed parts in position.

B shows in cross section the casing applied to the head of the steering shaft, and which may be given any suitable form, but here has the general outline of an elbow joint.

On the inner face may be a ringlike block b to receive the upper end of stud 2. On the shaft A is loosely mounted a threaded collar a to engage with one of the threaded openings of the case B, it bearing against the collar a' fixed on the steering shaft A so as to permit the shaft to turn in the collar while the latter holds the case B in place at that point. On the arm 3 is a similar collar c to engage the corresponding threaded opening of the case and which bears on the collar c' on the shaft 3 so as to permit the shaft to turn freely, but hold bar 3 and the gear 4 in place. At the outer end of the arm 5 is a similar case formed of parts D and E adapted to fit together around its circumference, each having the semitubular member d and e respectively, which are screw-threaded to receive collar E' to hold parts E and D together, and shown in Fig. 1 where the nut 10ᵇ is not shown but is located above collar E'. It is evident that the fitting of these parts or friction between them may be such as to maintain the arm and wheel in a given position.

As the steering shaft, A, sometimes rises vertically and at other times obliquely, it is desirable to have means for adjusting the plane of the steering wheel in combination with the other parts to enable the driver to place the wheel in such position as he may desire. I provide means for accomplishing this, which also adds to the rigidity and strength of the device. I provide tubular members 20 and 21 which fit into each other, the latter having stud 21ᵃ to slide in a slot 21ᵇ in the other member so that the two may be adjusted longitudinally but be held axially. They may be creased and ribbed as parts 10 and 11 if preferred. The inner end of member 20 is pierced to be put over stud 2 on which it is held by nuts 2ᵃ in position, yet so as to permit it to swing. The outer end of member 21 is threaded and projects slightly beyond sleeve 7. I provide bracket 22 which is apertured on one portion to slip over parts 8 and 10 and thereby hold gear 9 and its mount in place, and the other portion is apertured to receive the end of member 21 relative to which it is secured by nuts 22ᵃ. As the members 20 and 21 cannot turn axially, owing to their mounting on stud 2 and their connection, and as bracket 22 may be fixed on member 21 and engages the parts 8 and 10 which engage the wheel support, it is possible to adjust the wheel at any angle. This adjustment need not be fixed but nuts 22ᵃ may be loose enough to permit the wheel to be turned to any plane by the use of a little force.

In case it is desired to use the device for steering by the swing of the arm on the shaft, means may be used to fix gears 1 and 4 together. One method is by mounting a bolt 30, Fig. 1, to slide through gear 4 and into a recess in gear 1, the bolt being carried in a bore in the case and suitably mounted and adapted for the purpose. Other mechanical means may be preferred for this purpose and can be readily adapted. The shaft A and arm 3 may be notched or marked to indicate the point at which the gears register with the bolt.

Having described my invention, what I claim as new and desire to secure by Letters Patent, is:

1. A steering device comprising a shaft, a handle, an arm supporting the handle eccentric to the shaft and having operative means whereby the arm may be freely swung about the shaft without releasing hold of the handle and without turning the shaft, substantially as described.

2. In a device of the character described, a steering shaft, an arm pivotally mounted to swing about the shaft, a steering handle revolubly mounted on the arm, and operative connections between the steering handle and the shaft by which to turn the shaft by the turning of the steering handle upon its mounting, substantially as described.

3. In a vehicle, in combination with means for changing the direction of the vehicle, an arm pivotally mounted to swing about the said means and a hand-steering means mounted on the arm, the said arm being adapted to swing and maintain the same position of the hand-steering means to the operator, substantially as described.

4. In a steering device, an extensible shaft, an arm swingably mounted thereon and a handle mounted on the arm by members adjustable to regulate the position of the handle, substantially as described.

5. In a device of the character described, mechanism to change the direction of the vehicle, means connected therewith and provided with a hand-steering member and being mounted to permit swinging of the same without turning the hand-steering member and adapted to operate the steering mechanism upon the turning of said member, and said hand-steering member, substantially as described.

6. In a device of the character described comprising a shaft, an extensible arm pivotally mounted thereon, hand-steering means mounted on the arm by extensible connections whereby to adjust the length of the arm and the height of the hand-steering means, substantially as shown.

7. In a device of the character described, an extensible steering shaft, an extensible arm pivoted thereon and an extensible hand-steering means the said members coöperating whereby the position of the hand-steering means relative to the steering shaft may be adjusted, substantially as shown.

8. In a device of the character described, provided with an extensible steering shaft, an extensible arm and steering handle-means having an extensible mounting on the arm, said mounting being axially adjustable relative to the arm, substantially as shown.

9. In a device of the character described, mechanism for changing the direction of the vehicle, means for operating said mechanism by hand, the said means being normally before the operator but adapted to swing from said position, and said several members being constructed to permit universal adjustment of the said hand means, substantially as shown.

10. A steering device comprising a steering shaft, an arm and a handle, gears connecting the shaft and the arm and gears connecting the arm and the handle whereby the arm and handle may be swung freely around the shaft without turning the shaft, the handle maintaining an unchanged position in the hand of the operator, and whereby the shaft may be turned from the handle at any position thereof in its swing around the shaft, substantially as described.

11. A steering device comprising a steering shaft, an arm and a handle, gears connecting the shaft and the arm and gears connecting the arm and the handle whereby the arm and handle may be swung freely around the shaft without turning the shaft, the handle maintaining an unchanged position in the hand of the operator, and whereby the shaft may be turned from the handle at any position thereof in its swing around the shaft, and extension and adjusting means whereby to locate the handle and fix its plane of operation, substantially as described.

12. A steering device comprising a steering shaft, an arm and a handle, gears connecting the shaft and the arm and gears connecting the arm and the handle whereby the arm and handle may be swung freely around the shaft without turning the shaft, the handle maintaining an unchanged position in the hand of the operator, and whereby the shaft may be turned from the handle at any position thereof in its swing around the shaft, and means for locking the arm and the shaft together, substantially as described.

13. In a vehicle, a shaft, a steering handle mounted laterally thereto and means connecting the two to permit adjustment of the handle relative to the shaft and the operation of the handle in different planes and at different angles, substantially as described.

14. In a vehicle, steering mechanism and means for operating the same, the said means being adapted to swing freely on its bearing on the steering mechanism without affecting the steering mechanism and constructed to operate the same by the turning of the said steering means on its mounting, substantially as described.

15. In a vehicle, a steering mechanism, means to operate the same from any point in a circle, the said means being adapted to swing freely in the said circle, substantially as described.

16. In a vehicle, a steering mechanism, means to operate the same from any point in a circle, the said means being adapted to swing freely in the said circle without affecting said mechanism or disarranging the grasp of said means.

17. In a steering device, a shaft, a handle eccentric thereto, and means supporting the handle on the shaft and operatively connecting the two whereby the handle may be swung around the shaft without turning it and whereby the turning of the handle on its mounting is operative to turn the shaft.

18. In a vehicle, a steering mechanism, means to operate the same from any point in a circle, the said means being adapted to swing freely in said circle, and means normally to maintain the latter in a given position in the said circle.

19. In a vehicle, a steering mechanism, means to operate the same from any point in a circle, the said means being adapted to swing freely in said circle, and means normally to maintain the latter in a given position in the said circle, and means normally to maintain the handle in a given position.

20. In a device of the character described, mechanism for changing the direction of a vehicle, means for operating said mechanism by hand, the said means being normally before the operator but adapted to swing from said position without affecting the first said mechanism.

In testimony whereof I affix my signature in presence of two witnesses.

HENRY M. LOVE.

Witnesses:
H. C. BUCK,
E. T. DE GIORGI.